(12) United States Patent
Hong

(10) Patent No.: US 10,895,407 B2
(45) Date of Patent: Jan. 19, 2021

(54) FOLDABLE PARABOLIC TROUGH CONCENTRATOR

(71) Applicant: Amy Wei Hong, Buffalo Grove, IL (US)

(72) Inventor: Amy Wei Hong, Buffalo Grove, IL (US)

(73) Assignee: Jianhui Hong, Buffalo Grove, IL (US)

( * ) Notice: Subject to any disclaimer, the term of this patent is extended or adjusted under 35 U.S.C. 154(b) by 77 days.

(21) Appl. No.: 16/371,100

(22) Filed: Mar. 31, 2019

(65) Prior Publication Data

US 2020/0309416 A1 Oct. 1, 2020

(51) Int. Cl.
| | |
|---|---|
| *F24S 23/74* | (2018.01) |
| *F24S 30/425* | (2018.01) |
| *F24S 20/50* | (2018.01) |
| *F24S 20/30* | (2018.01) |
| *H04R 1/34* | (2006.01) |
| *F24S 25/00* | (2018.01) |
| *F24S 30/00* | (2018.01) |
| *F24S 23/70* | (2018.01) |

(52) U.S. Cl.
CPC ............... *F24S 23/74* (2018.05); *F24S 20/30* (2018.05); *F24S 20/50* (2018.05); *F24S 30/425* (2018.05); *H04R 1/342* (2013.01); *F24S 2023/87* (2018.05); *F24S 2025/012* (2018.05); *F24S 2030/16* (2018.05)

(58) Field of Classification Search
CPC .......... F24S 23/74; F24S 30/425; F24S 20/50; F24S 2030/16; F24S 2023/87; F24S 20/30; H04R 1/34; H04R 1/342; H04R 1/345
See application file for complete search history.

(56) References Cited

U.S. PATENT DOCUMENTS

| | | | | |
|---|---|---|---|---|
| 4,281,644 | A * | 8/1981 | Chiles | F24S 20/30 126/682 |
| 4,442,828 | A * | 4/1984 | Takeuchi | F24S 10/45 126/681 |
| 5,090,399 | A * | 2/1992 | Tarcici | F24S 23/715 126/682 |
| 6,637,428 | B2 * | 10/2003 | Winston | F24S 23/80 126/692 |

* cited by examiner

*Primary Examiner* — Daniel J Colilla
(74) *Attorney, Agent, or Firm* — Jianhui Hong

(57) ABSTRACT

The present disclosure relates to a parabolic trough concentrator to harness the sun's energy. The parabolic trough concentrator 5 comprises a trough concentrator structure 6, two semi-rigid reflecting sheets 50, a receiver 60, a support stand 80 and a telescopic mechanism 90. The parabolic trough concentrator 5 is designed to have a large reflecting surface area when it is in its extended state, and have a very compact footprint when it is disassembled, folded and collapsed to its retracted state.

16 Claims, 16 Drawing Sheets

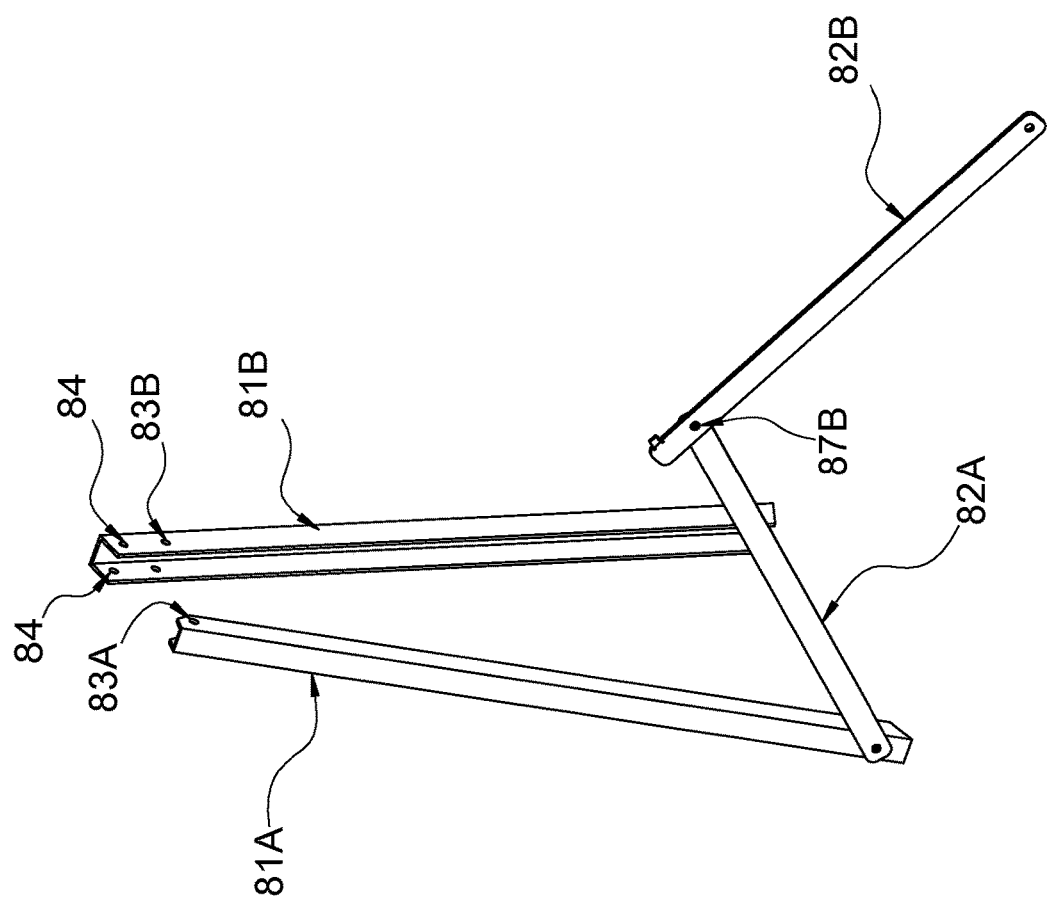

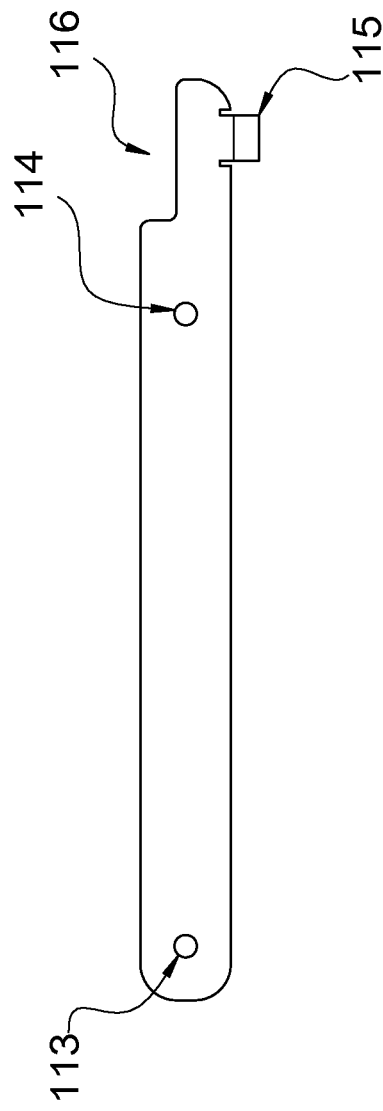
FIG. 11B
FIG. 11C
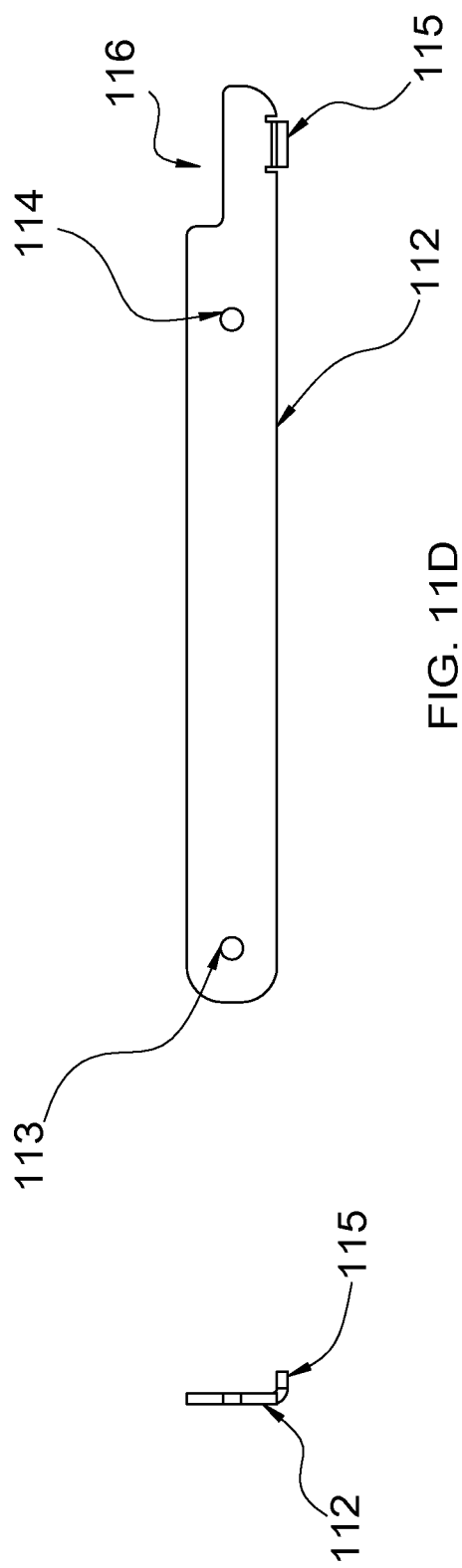
FIG. 11D

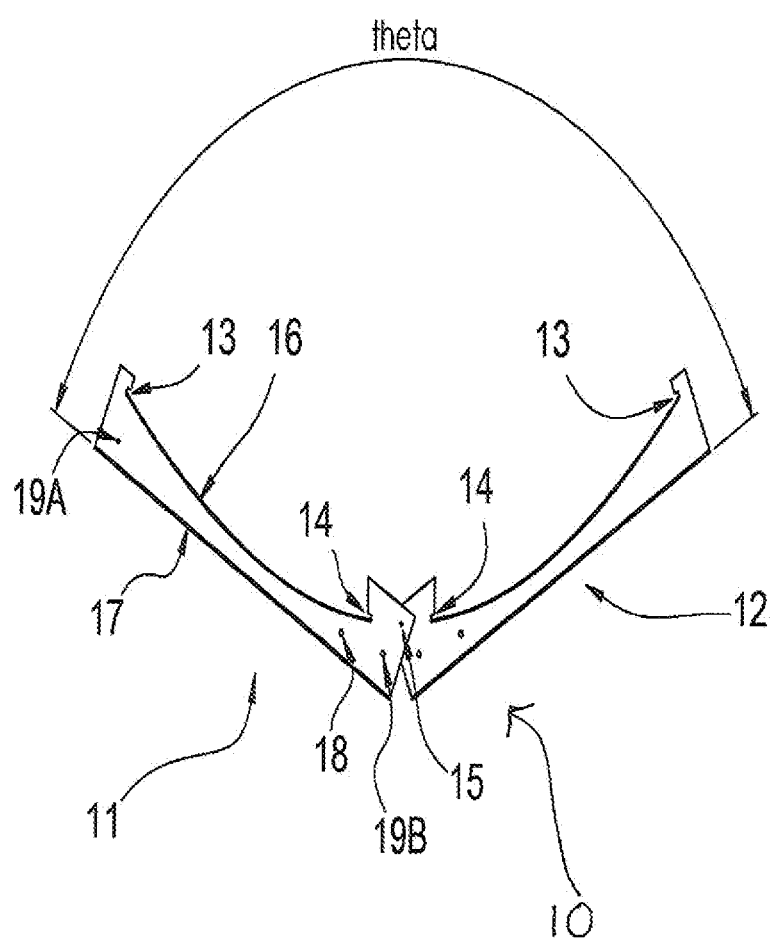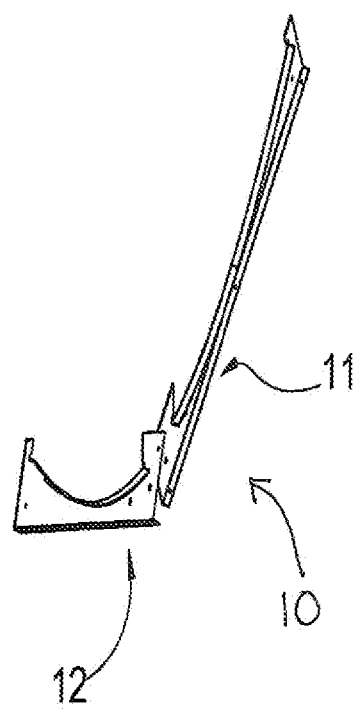
Fig. 13A
Fig. 13B

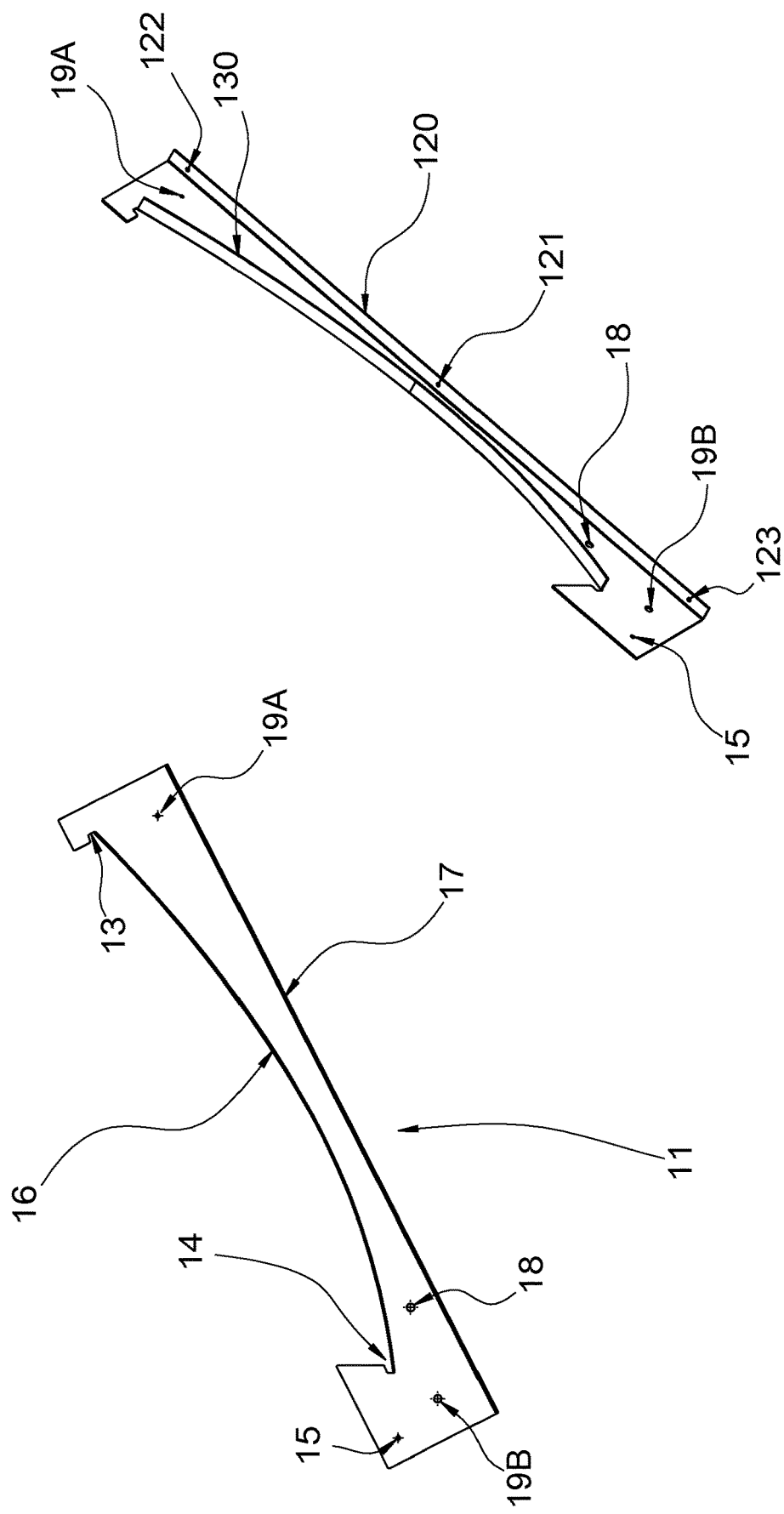

FOLDABLE PARABOLIC TROUGH CONCENTRATOR

BACKGROUND OF THE INVENTION

1. Field of the Invention

The present invention relates to a parabolic trough solar concentrator. More particularly, the present invention is a light-weight parabolic trough solar concentrator that has a large reflecting surface in its extended state and a very compact footprint in its retracted state for ease of transportation and storage.

2. Description of the Related Art

Developing cost-competitive alternative energy sources is of paramount importance with rising concerns over greenhouse gas emissions, climate change and energy independence. Solar energy is abundant and can easily meet the world's energy needs. However, conventional photovoltaic panels that convert sunlight into electricity are too expensive to gain widespread acceptance. Solar concentrators can be used to reduce the cost of solar electricity by putting more solar energy on a given panel area. Solar concentrators can also be used to generate usable thermal energy in applications such as solar water heaters or solar cookers. On the one hand, it is highly desirable to increase the reflecting surface of the solar concentrator in order to generate more power from solar radiation. On the other hand, a large reflecting area often means the solar concentrator is bulky and heavy. There exist in the market solar cookers that can be folded to reduce space, such as the GoSun Grill or GoSun Sport solar cookers. However, folding the reflector pieces like a clamshell only save space in one direction, and the result is one of two things: either the overall size of the solar cooker remains too bulky, or an undersized reflecting surface leading to low thermal power and slow cooking. There exist in the market solar concentrators that can be taken apart for transportation, such as the SolSource solar cooker by the OneEarthDesigns company. However, assembling and disassembling these dish-shape solar concentrators are too time consuming, and often requires special tools and skills. The SolSource solar cooker uses curved dish segments. Even after disassembling, the package of SolSource solar cooker remains very large. There is clearly a need to develop a solar concentrator that can be quickly transformed between its extended and retracted states in which the solar concentrator has a large reflecting surface area in its extended state, and has a dramatically reduced footprint in its retracted state.

SUMMARY OF THE INVENTION

The present application discloses a novel trough concentrator design that is light-weight, highly compact in its retracted state, and has a large reflecting surface area in its extended state.

The following presents a simplified summary of the disclosure in order to provide a basic understanding of some aspects disclosed herein. This summary is not an exhaustive overview, and it is not intended to identify key or critical elements of the disclosure or to delineate the scope of the disclosure. Its sole purpose is to present some concepts in a simplified form as a prelude to the more detailed description that is discussed later.

In one embodiment, a parabolic trough concentrator 5 comprises a trough concentrator structure 6, two semi-rigid reflecting sheets 50, a receiver 60, a support stand 80 and a telescopic mechanism 90. The trough concentrator structure 6 comprises pairs of support ribs 10, pairs of receiver supports 20, spreaders 110, scissor mechanisms 100 and extensions arms 31. Each pair of support ribs comprises two support ribs that are attached to each other for pivotal movement (i.e. folding) relative to each other. When the two ribs in each pair are extended pivotally to a prescribed extended angle, the curved edges of this pair of support ribs conform to a prescribed parabolic curve. When the two ribs in each pair are folded pivotally to a roughly zero angle, the total size of the pair is reduced dramatically. Space saving is thus achieved by folding in the cross-sectional dimension of the trough concentrator.

The semi-rigid reflecting sheet is supported by the plurality of pairs of support ribs by compression force and friction to facilitate quick removal and installation of the reflecting surface. The reflecting sheet is not supported using fasteners, which are too time consuming for repeated removal and installation. The reflecting sheet is not attached to the support ribs by adhesive, which is somewhat permanent, not suitable for repeated removal and installation. The semi-rigid reflecting sheet is flexible enough to allow bending to conform to the parabolic curve; however it should not be too flimsy in order for it to retain the parabolic shape, and in order to prevent excessive warping, drooping, sagging and wrinkling between two adjacent pairs of support ribs. The reflecting sheet can be bent due to its relatively weak resistance to compression force, while the support ribs have grooves on its ends to exert a compression force to retain the reflecting sheet in the desired parabolic shape.

The pairs of support ribs are spaced by spreaders and scissor mechanisms. When the reflecting sheets are removed, the distance between two adjacent pairs of support ribs can be reduced to a minimum. In this manner, space saving can be achieved in the longitudinal direction of the trough concentrator. The longitudinal direction, being a straight line segment, has two ends, a first end and a second end.

The receiver is located at the focal line. The support stand is pivotably connected to the parabolic trough so that the trough can swivel around an axis that is parallel to the longitudinal axis. A telescopic tube is used to control the inclination angle of the trough concentrator.

These and other embodiments of the present disclosure will be discussed more fully in the detailed description. The features, functions, and advantages can be achieved independently in various embodiments of the disclosure, or may be combined in yet other embodiments.

BRIEF DESCRIPTION OF THE DRAWINGS

This disclosure may be understood by reference to the following description taken in conjunction with the accompanying drawings, in which like reference numerals identify like elements, and in which:

FIG. 8 is a perspective exploded view of some parts of the support stand 80 in FIG. 4.

FIG. 11B is the front view of a flat pattern for an arm 112 used in spreader 110.

FIG. 11C is a side view of an arm 112.

FIG. 11D is a front view of an arm 112, which can be made from flat pattern in FIG. 11B.

FIG. 13A is a front view of a pair of support ribs 10.

FIG. 13B is a perspective view of the same device in FIG. 13A.

FIG. 14A shows a rear view of a support rib 11.

FIG. 14B shows a perspective view of the same support rib in FIG. 14A.

Figure 1:
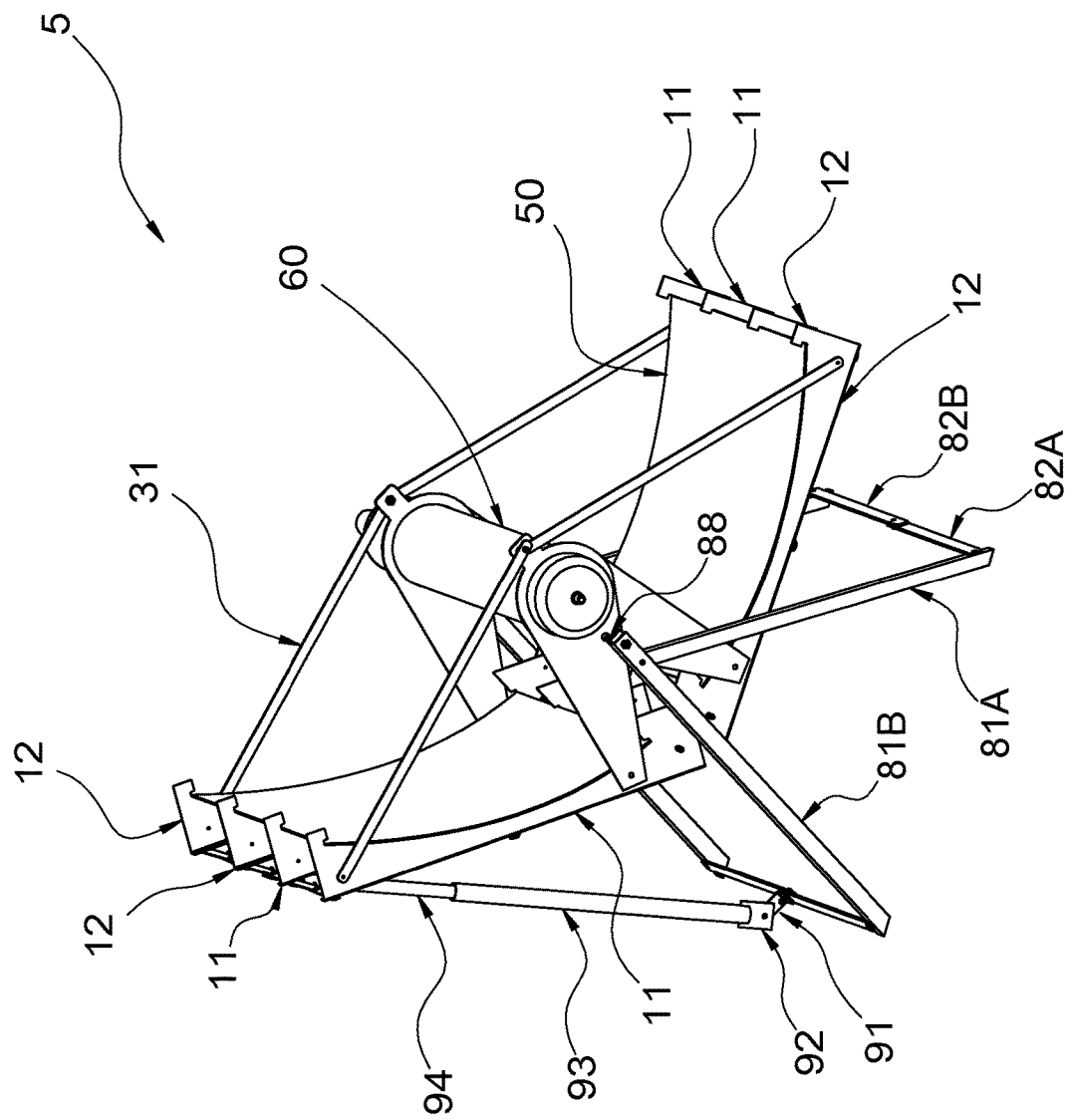
FIG. 1 is a perspective view of an embodiment of the foldable parabolic trough concentrator 5 used in a solar cooker application.

While the disclosed embodiments are susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims in the non-provisional application.

DESCRIPTION OF THE PREFERRED EMBODIMENTS

For the purpose of this disclosure, the word "parabolic" and "parabola" shall include any shape or curve that can concentrate a wave phenomenon such as light, sound and electromagnetic waves in general. Therefore, parabolic shapes or curves in this disclosure shall include but are not limited to, parabola, hyperbola, ellipse, and spherical curve.

In the following detailed description, reference is made to the accompanying drawings that form a part hereof, and in which is shown by way of illustration specific embodiments in which the disclosed apparatus may be practiced. These embodiments are described in sufficient details to enable those skilled in the art to practice the disclosure, and it is to be understood that other embodiments may be utilized and that various changes may be made without departing from the spirit and scope of the disclosure. The following detailed description is, therefore, not to be taken in a limiting sense.

FIG. 1 shows a perspective view of a parabolic trough concentrator 5 used in a solar cooker application. The parabolic trough concentrator 5 comprises a trough concentrator structure 6, two reflecting sheets 50, a receiver 60, a support stand 80 and a telescopic mechanism 90. The parabolic trough concentrator 5 is designed to have a large reflecting surface area when it is in its extended state as in FIG. 1, and have a very compact footprint when it is disassembled, folded and collapsed to its retracted state, see FIGS. 9A, 9B for the retracted state of the support stand 80 and FIG. 10 for the retracted state of the trough concentrator structure 6. In particular the parabolic reflecting surface is broken down into two smaller reflecting sheets 50. Each reflecting sheet 50 is supported by four support ribs connected by a scissor mechanism 100 and three spreaders 110. A receiver 60 is supported by two pairs of receiver supports 20, one pair at each end of the trough concentrator structure 6. The pair 10 comprises support ribs 11 and 12. The pair 20 comprises receiver supports 21 and 22.

The receiver 60 extends in the direction of the focal line of the trough concentrator structure 6. The receiver 60 is an evacuated solar tube in the particular embodiment in FIG. 1. However, since the trough concentrator 5 has other applications, the receiver 60 could be a photovoltaic panel in a cylindrical form for power generation from the sunlight; or it could be a receiver for electromagnetic or sound signals, or any other concentratable phenomenon.

The trough concentrator structure 6 is pivotally supported by a support stand 80. The support stand 80 can be lifted off the ground and rotated in a horizontal plane, adjusting the azimuthal angle per the location of the sun. A telescopic mechanism 90 is used to adjust the inclination angle (also known as the zenith angle) of the trough concentrator structure 6. In order to track the sun and maximize the solar irradiation, it is necessary to adjust both the azimuthal angle and the zenith angle periodically. The adjustment of these two angles could be manual or automated using a heliostat, which is not discussed in details in this disclosure. When the sun is right above, the parabolic trough concentrator should be pointing straight upward to maximize the solar energy collected. The zenith angle is defined to be zero when the trough concentrator is at this position.

Figure 2:
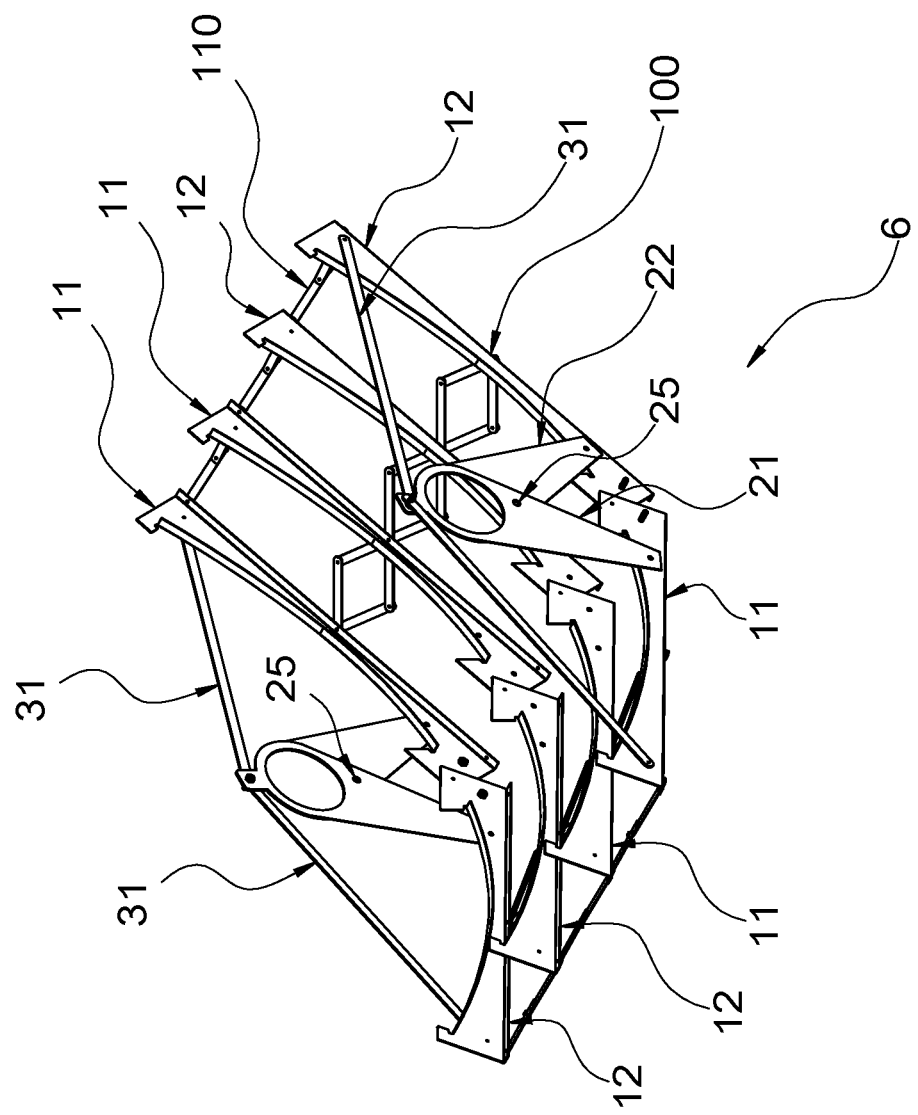
FIG. 2 is a perspective view of the trough concentrator structure 6 in its extended state.

FIG. 2 shows a perspective view of a trough concentrator structure 6 in it extended state. The trough concentrator structure 6 comprises four pairs of support ribs 10, connected by two scissor mechanisms 100, six spreaders 110, two pairs of receiver supports 20, and four extension arms 31. A pair of support ribs 10 comprises a left-handed support rib 11 and a right-handed support rib 12, pivotably connected through pivot holes 15 (see FIGS. 12A and 13A) by a fastener such as a rivet. A pair of receiver supports 20 comprises a receiver support 21 and a receiver support 22, connected through pivot holes 28 by a fastener (see FIG. 12A), such as a threaded bolt and a wing-nut.

The four pairs of support ribs 10 are connected by two scissor mechanisms 100 and spreaders 110. The two scissor mechanisms 100 allow the distance between these four pair of support ribs 10 to vary, allowing dramatic space reduction in the longitudinal direction when the trough concentrator structure 6 is collapsed.

In the extended state as shown in FIG. 2, the four extension arms 31 are used to maintain the angle between support ribs 11 and 12 to 126 degrees and maintain structural stability of the trough concentrator structure 6. In the extended state as shown in FIG. 2, the six spreaders 110 are used to maintain the distance between the four pairs of support ribs 10 at a desired value.

Figure 3B:
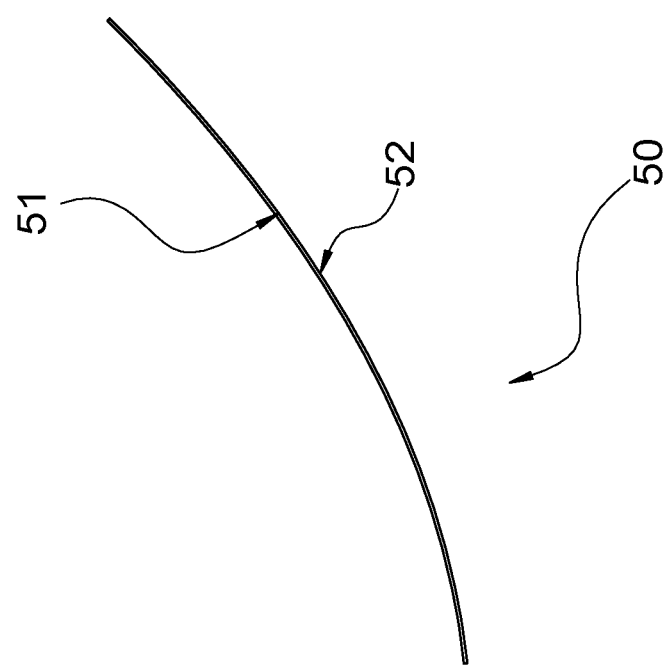
FIG. 3B is a side view of the same semi-rigid reflecting sheet in FIG. 3A.
Figure 3A:
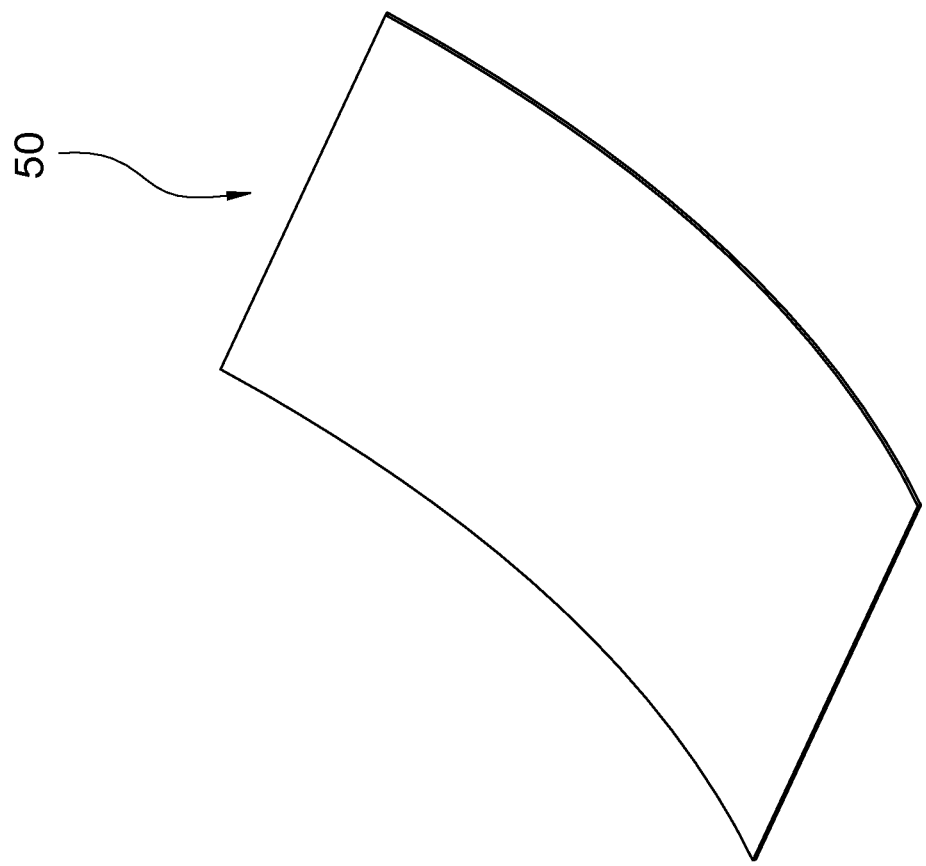
FIG. 3A is a perspective view of a semi-rigid reflecting sheet.

FIGS. 3A and 3B are perspective view and side view of a reflecting sheet 50 that is bent by compression force to conform to a parabolic-shape curve on support ribs 11 or 12. Reflecting sheet 50 is not attached to support ribs 11 or 12 by fasteners such as bolts and nuts, or by adhesives. Reflecting sheet 50 is held in place by compression force and friction force only. This method of supporting the reflecting sheet is advantageous in that it is easy to assemble and disassemble the reflecting sheets from the parabolic trough concentrator 5. After the reflecting sheets 50 are removed from the support ribs, they can be flattened and stacked up with other elements of flat shapes for ease of transportation or storage. Alternatively, they can be rolled at a small radius into a small cylinder for ease of transportation and storage. Referring to FIG. 3B, the reflecting sheet 50 receives incident solar radiation and reflects it to a focal line above the upper surface 51. In one embodiment, the upper surface is a thin reflecting material such as aluminized mylar or a reflective film made by the company ReflecTech, and the lower surface 52 is a flexible plastic backing sheet. In another embodiment, the upper surface 51 is a transparent plastic sheet, and the lower surface 52 is a reflective metal layer (made out of aluminum, silver or gold, etc) coated on the plastic sheet. In yet another embodiment, the reflecting sheet 50 is an anodized aluminum sheet, with the top surface 51 being a smooth anodized surface, and the lower surface 52 being regular aluminum surface. Many embodiments exist and are suitable for use as reflecting sheet 50 in the disclosed invention, however the suitable candidates should share a common trait: that the reflecting sheet 50 is semi-rigid. Reflecting sheet 50 is preferably flexible enough to be bent by compression force exerted by the pair of support ribs 10, and rigid enough so that it does not droop or sag excessively between two adjacent pairs of support ribs 10.

Figure 4:
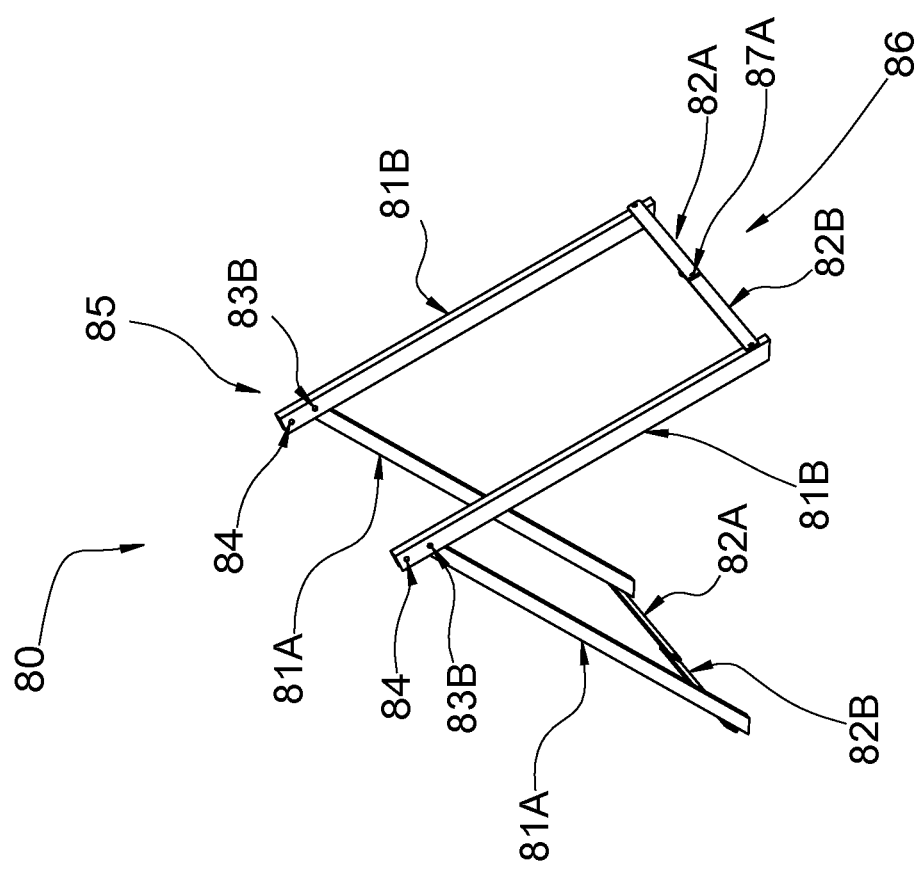
FIG. 4 is a perspective view of the support stand 80 for the parabolic trough concentrator in its extended state.

FIG. 4 shows a perspective view of the support stand 80 in its extended state. The support stand 80 comprises two A-frame structures 85 and two spreaders 86. Each A-frame structure 85 comprises two legs: a first leg 81A and a second leg 81B. In this particular embodiment, the leg 81A is made out of a square aluminum tube, and the leg 81B is made out of a U-shape aluminum channel. Each leg 81A has pivot holes 83A (see FIG. 8) for pivotable connection to a leg 81B using a pivot pin through pivot holes 83A and 83B. Each leg 81B has pivot holes 83B for pivotable connection to a leg 81A, and pivot holes 84 (see FIG. 8) for pivotable support of the trough concentrator structure 6. Each spreader 86 comprises an arm 82A and an arm 82B. The two spreaders 86 allows the distance between the two A-frames to be varied between a minimum value (e.g., about 1 inch) and a maximum value (e.g., about 26 inches). A single long threaded rod 88 (not shown in FIG. 4, see FIG. 1) going through holes 84 in both legs 81B can be used to pivotably support the trough concentrator structure 6 through holes 25 in both pairs of receiver support 20.

Figure 5:
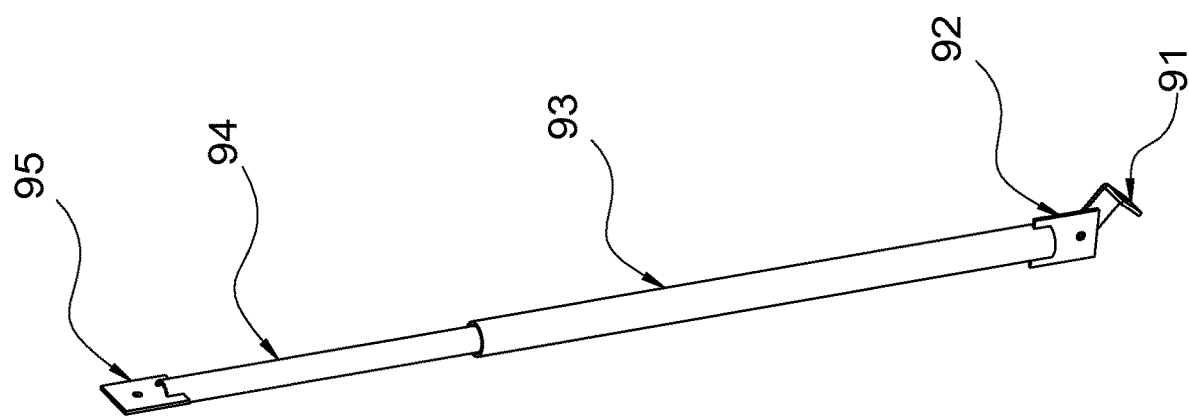
FIG. 5 shows a perspective view of the telescopic mechanism 90.

FIG. 5 shows a perspective view of a telescopic mechanism 90. It comprises a larger tube 93, and smaller tube 94 inserted inside tube 93. A plate 95 is attached to the smaller tube 93. A plate 92 is attached to the larger tube 92. An L-shape bracket 91 has base flange and an edge flange, each having a pivot hole. The edge flange of the bracket 91 is pivotably connected to plate 92 using a fastener such as a rivet. The base flange of the bracket 91 is used to attach the telescopic mechanism 90 to the pivot holes 87A and 87B on the spreader 86 of support stand 80 through a fastener such as a threaded bolt and a wing-nut for ease of assembly and disassembly.

Figure 6:
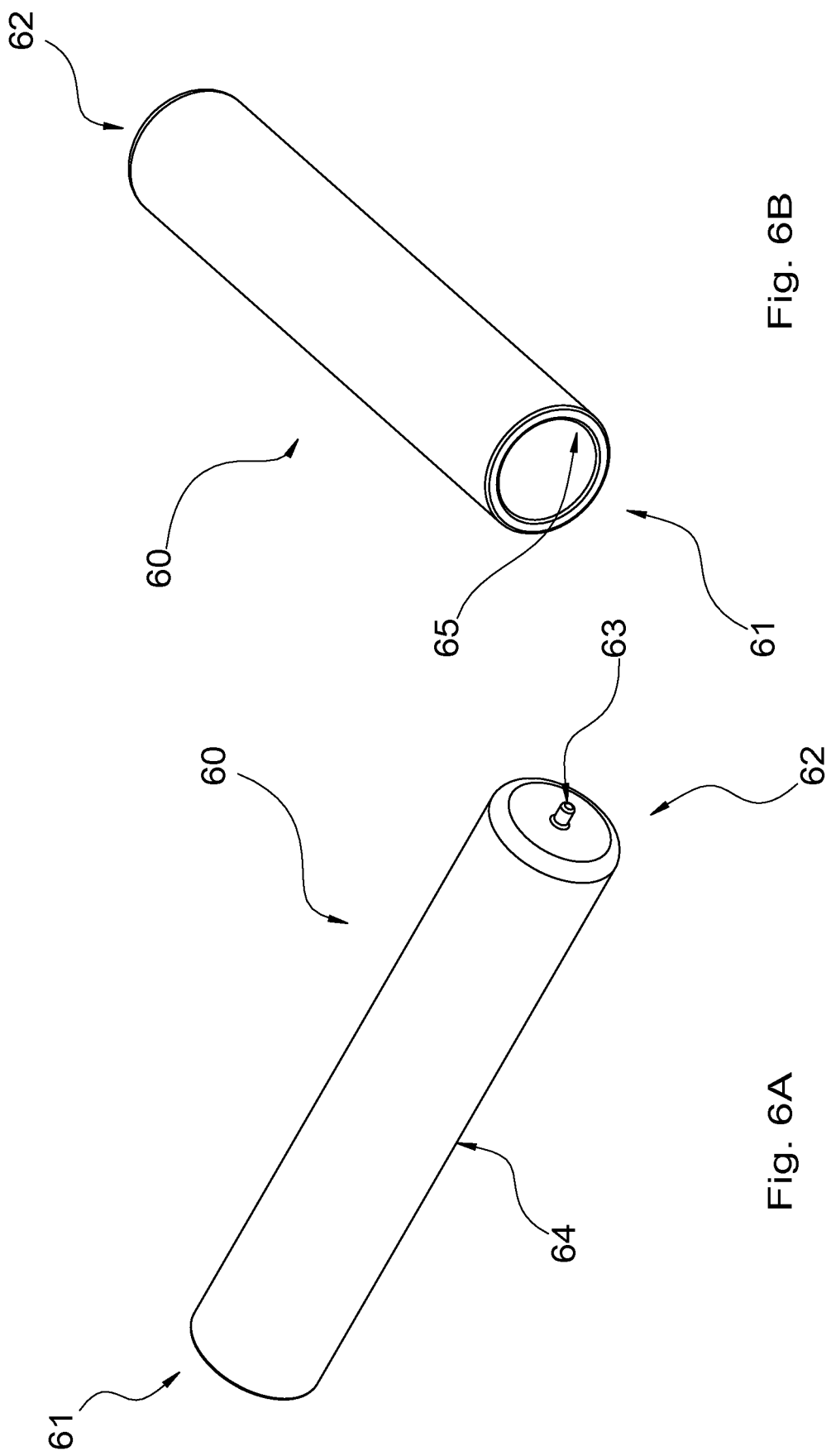
FIG. 6A shows a perspective view of an evacuated solar tube.
FIG. 6B shows another perspective view of the same device in FIG. 6A.

FIGS. 6A and 6B shows two perspective views of a receiver 60. In this particular embodiment, the receiver 60 is an evacuated solar tube, having an open end 61 and a closed end 62, an outer wall 64 and an inner wall 65. The closed end 62 has a small hollow stem 63, which was used to draw a vacuum between the inner wall 65 and the outer wall 64 during the manufacturing process.

Figure 7:
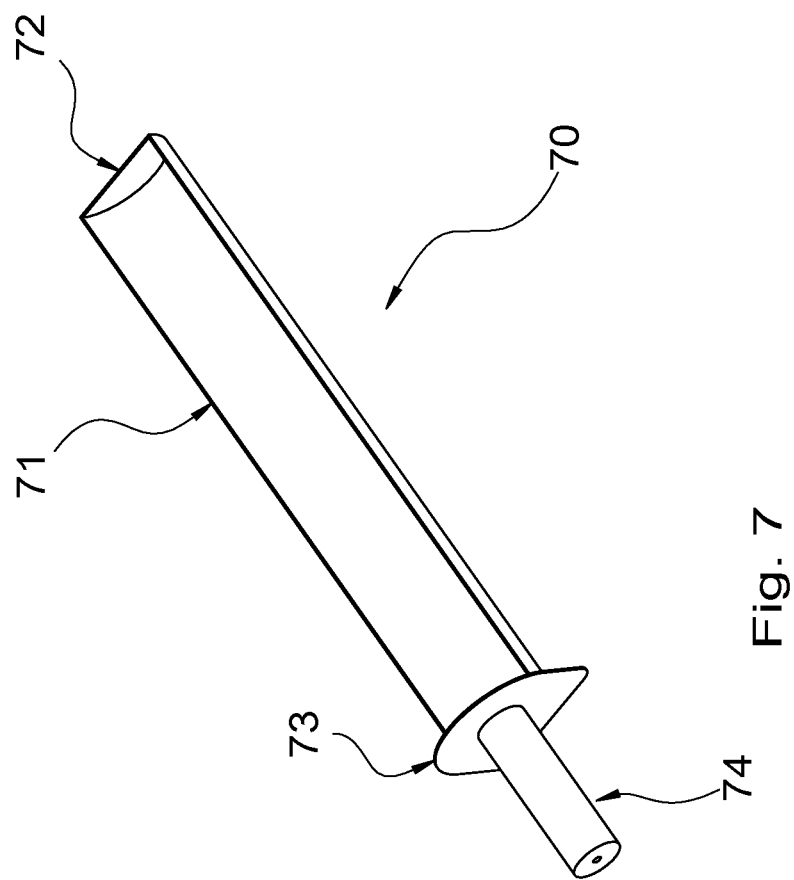
FIG. 7 is a perspective view of a tray 70 that can be used for solar cooking.

FIG. 7 shows a perspective view of a tray used for solar cooking. The tray comprises a half cylinder 71, an end plate 72, a head plate 73, and a wooden handle 74. Preferably parts 71 through 73 are all made out of stainless steel, but they can be made out of other materials commonly used in food service, such as aluminum or anodized aluminum. The wooden handle 74 is secured to head plate 73 using a fastener for ease of attachment and detachment. Foods and liquid can be placed in the tray, and the tray can be inserted into the evacuated tube in FIG. 6 to receive the heat from the parabolic trough concentrator 5.

FIG. 8 shows an exploded perspective view of some parts of the support stand in FIG. 4. A leg 81A is made out of a square aluminum tube. It has pivot holes 83A at the top end. A leg 81B is made out of an U-shape aluminum channel. It has pivot holes 83B near the top end. The leg 81A is smaller in its cross-sectional dimensions than those of the leg 81B so that it can fit inside the channel of the leg 81B, allowing the support stand 80 in FIG. 4 to have a compact form factor in its retracted state, see FIGS. 9A and 9B. The leg 81A and the leg 81B can be pivotably connected to form an A-frame 85 by placing the leg 81A inside the channel of the leg 81B, aligning pivot holes 83A to 83B, and inserting a pivot pin (not shown) through pivot holes 83A and 83B. The legs 81A and 81B can swivel against each other allowing the angle between 81A and 81B to change from 0 to 60 degrees, allowing the A-frames to be extended (see FIG. 4) and retracted (see FIGS. 9A and 9B). Each set of spreader 86 comprises two arms 82A and 82B, pivotably connected using a fastener (such as a rivet, or bolt and wingnut) through pivot holes 87A and 87B. The arm 82B has a small edge flange that functions as a stopper to keep arms 82A and 82B aligned and locked in the extended state. Referring to FIG. 4, the two A-frames 85 are connected through two sets of spreaders 86. The spreaders 86 allows the distance between the two A-frames to vary between a minimum value and a maximum value, corresponding to the retracted state and the extended state of the support stand 80. The spreader 86 is similar to the spreader 110 in design but differs in length. A single long threaded rod 88 (not shown in FIG. 8 or FIG. 4, but shown in FIG. 1) going through holes 84 in both legs 81B can be used to pivotably support the trough concentrator structure 6 through holes 25 in both pairs of receiver support 20.

Figure 9B:
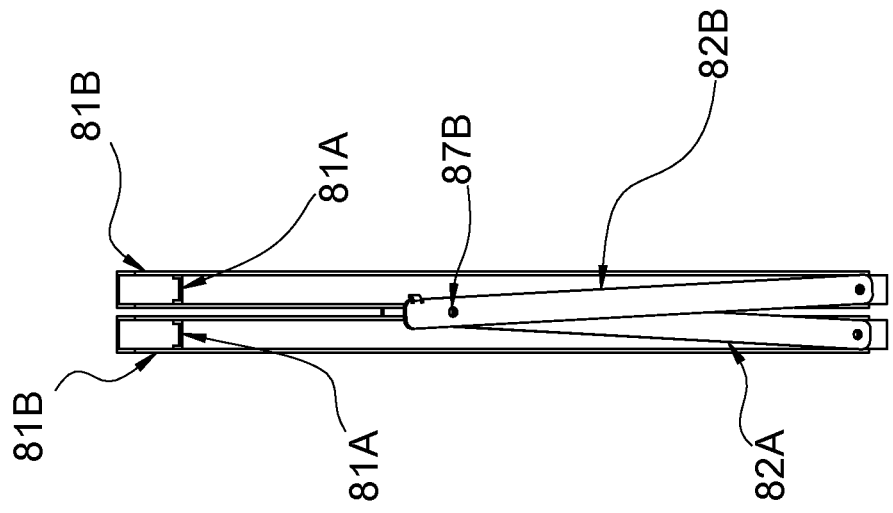
FIG. 9B is another perspective view of the same device in FIG. 9A.
Figure 9A:
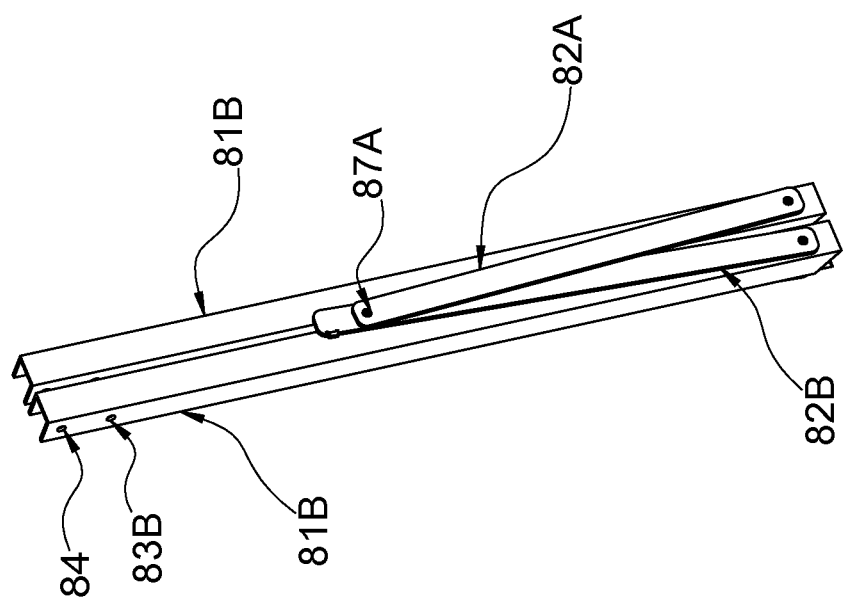
FIG. 9A is a perspective view of the same support stand in FIG. 4 in its retracted state.

FIG. 9A shows a perspective view of the support stand 80 in its retracted state. As can be seen, the legs 81A are inside the channels of the legs 81B, and the distance between the two A-frames are reduced to the minimum, allowing the support stand 80 to take an extremely compact form. FIG. 9B shows another view of the support stand 80 in its retracted state, showing how legs 81A fit inside legs 81B. Each spreader 86 comprises of an arm 82A and an arm 82B, pivotably connected through holes 87A and 87B using a fastener. FIG. 9A shows how the arms of a spreader 86 are pivotably attached to legs 81B. FIG. 9B shows how the arms of a spreader 86 are pivotably attached to legs 81A.

Figure 10:
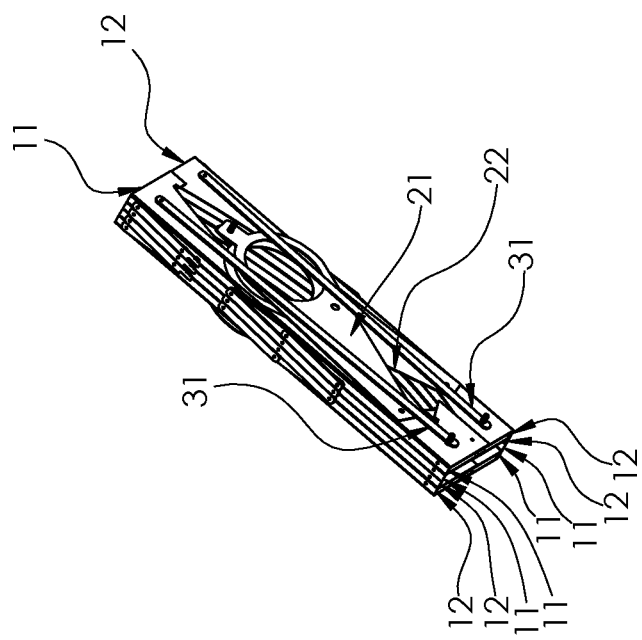
FIG. 10 is a perspective view of the same trough concentrator structure 6 as shown in FIG. 2 but in its retracted state.

FIG. 10 shows a perspective view of the trough concentrator structure 6 in its retracted state. The overall size of the trough concentrator structure 6 in its retracted state is dramatically smaller than its extended state shown in FIG. 2.

This dramatic reduction of overall size is achieved by first loosening the fasteners on holes 28, detaching the hooks 33 of the arms 31 from the fastener on holes 28, then folding in two different directions: first the clamshell-style folding of each pair of ribs 10 in the cross sectional direction (by varying the angle theta, see FIG. 13A); and second the reduction of distance between the four adjacent pairs of ribs, 10 through the scissor mechanisms 100 and the spreaders 110 in the longitudinal direction.

Figure 11A:
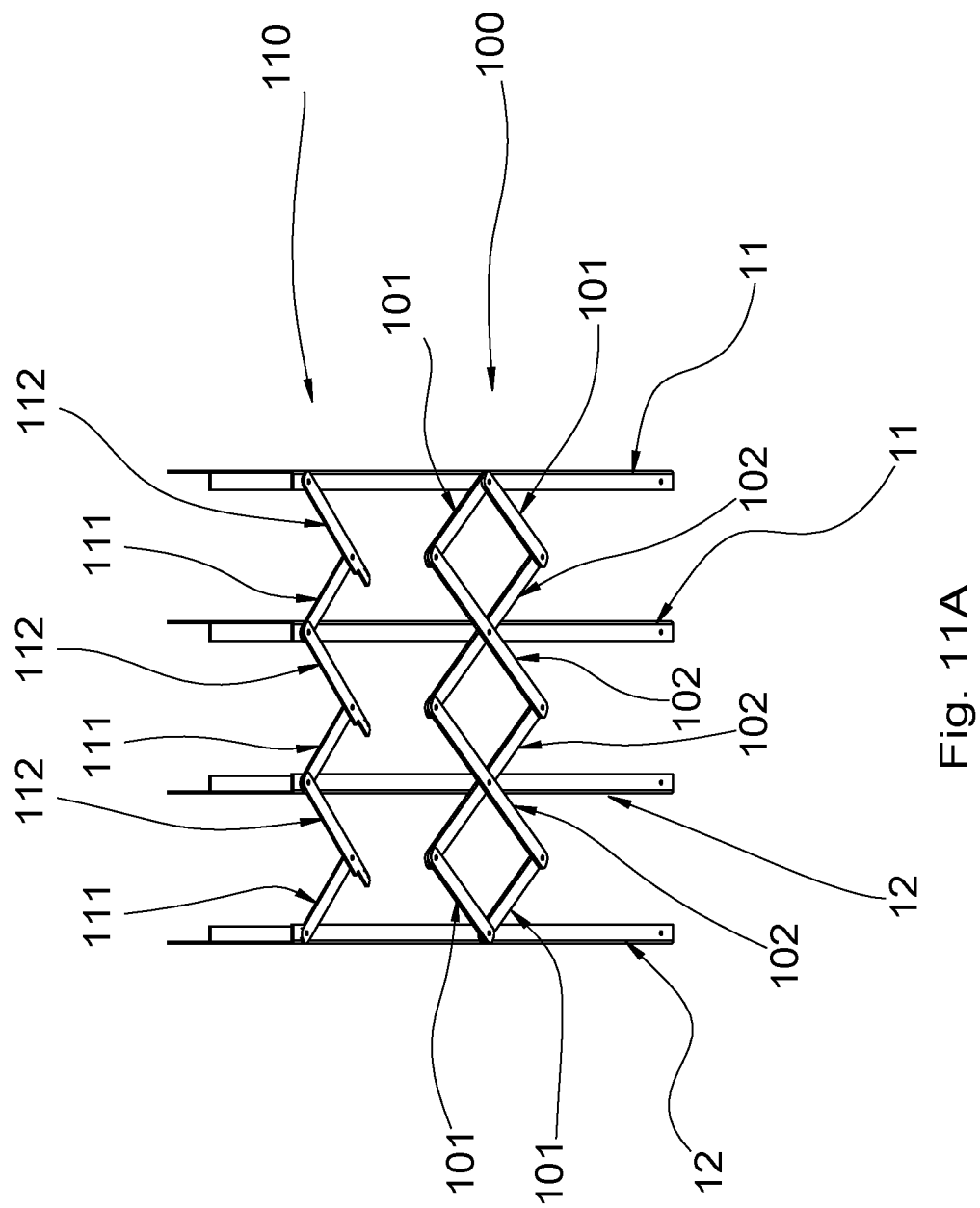
FIG. 11A is a side view of four support ribs with the scissor mechanism 100 and spreaders 110.

FIG. 11A shows how adjacent support ribs 11 and 12 are connected by a scissor mechanism 100 and three spreaders 110. In this particular embodiment, the scissor mechanism 100 comprises four short arms 101, and four long arms 102. Each short arm 101 is a thin flat strip with pivot holes at both ends. Each long arm 102 is a thin flat strip, with pivot holes at both ends and a third pivot hole at the center. The scissor mechanism 100 is pivotably attached to the center pivot hole 121 on the edge flanges 120 (see FIG. 14B) of support ribs 11 and 12. The scissor mechanism 100 allows the center-to-center distance between two adjacent support ribs (11 or 12) to vary between a maximum value (e.g., 7 inches) and a minimum value (e.g., 0.6 inch). Each spreader 110 comprises an arm 111 and an arm 112, pivotably connected through pivot holes. The spreaders 110 are pivotably attached to the top pivot holes 122 on the edge flanges 120 (see FIG. 14B) of support ribs 11 and 12. Optionally three spreaders 110 could be pivotably attached to the bottom pivot hole 123 on the edge flanges 120 of the support ribs 11 and 12, see FIG. 14B. The arm 111 is a thin flat strip with pivot holes at both ends.

FIG. 11B shows the flat pattern of the arm 112, which has two pivot holes 113 and 114, and a notch 116. The notch 116 was there to allow adjacent arms 112 to be spaced closely to each other without interfering with edge flanges 115 from the next arm 112, see FIG. 10 for illustration of potential interference of adjacent spreaders 110. 11C shows a side view of the arm 112. It can be seen that edge flange 115 is perpendicular to the base flange of the arm 112. FIG. 11D shows a front view of the same arm 112 as shown in FIG. 11C.

Referring to FIGS. 11B, 11C, and 11D, the arm 112 is a thin flat strip with pivot holes 113 and 114 at both ends, but it also has a small edge flange 115 that functions as a stopper. In a particular embodiment, the arm 112 was made by first laser cutting a flat pattern (see FIG. 11B) from a sheet of aluminum of 0.060 inch thickness, then going through a process of "press breaking" to create the edge flange 115 (see FIGS. 11C and 11D). The edge flange 115 functions as a stopper to limit the range of angles between arms 111 and 112 to zero and 180 degrees. When arms 111 and 112 are aligned (i.e., the angle between arms 111 and 112 is 180 degree), the spreader 110 is at its extended position, and the distance between adjacent support ribs (11 or 12) is at the maximum value. When the angle between arms 111 and 112 is almost zero, the spreader 110 is at its retracted position, and the distance between adjacent support ribs is at the minimum value, see FIG. 10. In an alternative embodiment, the scissor mechanism 100 is replaced with another set of three spreaders 110.

Figure 12A:
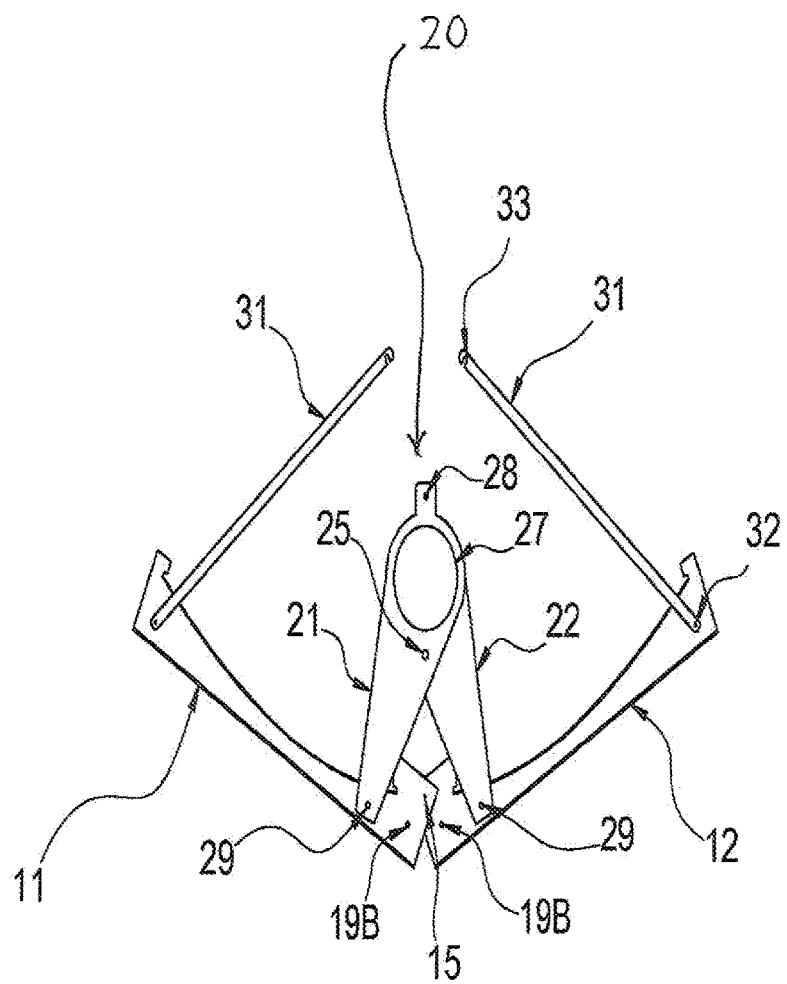
FIG. 12A is a front view of a pair of support ribs 10 in its extended state with a pair of receiver supports 20, and two extension arms 31.
Figure 12B:
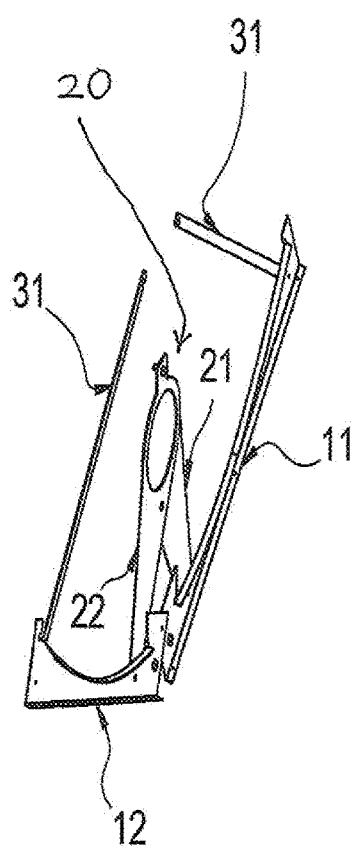
FIG. 12B is a perspective view of the same devices in FIG. 12A.

FIG. 12A illustrates a pair of support ribs 10 with a pair of receiver supports 20 and two extension arms 31. The pair of support ribs 10 comprises two support ribs 11 and 12. The pair of receiver supports 20 comprises two receiver supports 21 and 22. These elements are used at both ends of the trough concentrator structure 6. FIG. 12B shows a perspective view of the same device in FIG. 12A. Each extension arm 31 is a thin narrow strip of material with a hole 32 near one end, and a hook-shaped opening 33 near another end. The hole 32 allows the arm 31 to be pivotably connected to support rib 11 or 12. The hook-shaped opening 33 allows the arm 31 to be secured to a bolt through holes 28 on receiver support 21 and 22.

FIG. 13A shows a pair of support ribs 10 in its extended state. The pair 10 comprises two support ribs 11 and 12, pivotably connected by a rivet through pivot holes 15. Support ribs 11 and 12 are mirror images to each other, so they are very similar in terms of manufacturing. Support rib 11 or 12 can be made by first laser cutting a flat pattern out of a sheet aluminum, followed by a process of "press breaking" to create the edge flange 120, see FIGS. 13B and 14B.

Referring to FIGS. 14A and 14B, edge flange 120 is on edge 17 of the base flange of support rib 11. An optional curved strip 130 is attached the curved edge 16. Curve edge 16 conforms to a parabolic curve. Curved strip 130 can be attached to edge 16 using different attachment techniques including but not limited to welding, soldering, gluing, riveting and other fastening methods. The curved strip 130 serves to give additional support to a reflecting sheet 50. In an alternative embodiment, curve strip 130 is not a continuous trip; rather it is broken into smaller segments (not shown). The top surface of these segments conform to the curved edge 16 just like curve strip 130 does; together the segments serves to give additional support to a reflecting sheet 50.

Referring to FIGS. 12A and 13A, pivot holes 18 and 29 can be used to pivotably connect support rib 11 to receiver support 21, or pivotably connect support rib 12 to receiver support 22, by first aligning holes 18 and 29, then using a fastener such as a rivet through pivot holes 18 and 29. Pivot hole 18 is not used in pairs of support ribs 10 that are not at either end of the trough concentrator structure 6. Referring FIG. 12A and FIG. 15, receiver supports 21 and 22 are pivotably connected to each other using a rivet going through holes 25. Holes 25 are large enough to accommodate a rivet with a through-hole in the center of the rivet. The through-hole in the center of the rivet allows a long rod 88 (see FIG. 1) to go through. The long straight rod 88, going through holes 25 and 84, allows the trough concentrator structure 6 to be pivotably supported by support stand 80. Adjusting the length of telescopic mechanism 90 allows the trough concentrator structure 6 to pivot against the axis of long rod 88, thus changing the zenith angle of the trough concentrator structure 6.

Referring to FIG. 13A, support rib 11 or 12 has at least one edge 16 that is curved per a parabolic equation. The angle formed between the two straight edges 17 is given a name theta.

In the example shown in FIG. 13A, theta is 126 degrees. The pair of support ribs 10, when in its extended state in FIG. 13A, have the curved edges 16 conform to a parabolic equation $y=x*x/(4*L)$, where L is the focal length. A reflecting sheet 50 is bent by the compression force exerted by the grooves 13 and 14, and held in place following the curved edge 16. Two reflecting sheets 50 (see FIG. 1) supported by edges 16 have a gap in reflecting surface between grooves 14 (shown in FIG. 13A, one on support rib 11 and the other on support rib 12), however the gap between two grooves 14 are shaded by the receiver 60 when the parabolic trough concentrator 5 is pointed properly at the sun, therefore there is no net loss to the total amount of solar energy collected by the parabolic trough concentrator 5 due to this gap in reflecting surface. The existence of this gap in the reflecting surface is advantageous in that by observing the shadow of the receiver 60 relative to this gap on the ground, the inclination angle of the trough concentrator can be adjusted to track the sun. Since the sun moves in the sky over time from the perspective of an observer standing still on earth, it is necessary to adjust both the azimuth angle and the inclination angle of the trough concentrator in order to track the sun and maximize the solar irradiation to the receiver 60. As the sun moves in the sky, the shadow of the receiver 60 will move relative to this gap between grooves 14, creating a bright line of sunlight along the longitudinal direction on one side of the shadow of the receiver 60 on the ground. In order to track the sun, the support stand 80 has to be rotated on a horizontal plane, manually or automatically by a heliostat (not shown in this disclosure), to change the azimuth angle. The azimuth angle can be adjusted until the shadows of legs 81A and 81B are aligned. By adjusting the inclination angle (also referred to as zenith angle or elevation angle) of the trough concentrator using the telescopic tube 90, it is possible to make the bright line of sunlight next to the shadow of the receiver 60 disappear, and thus making the trough concentrator pointed properly at the sun again.

Figure 15:
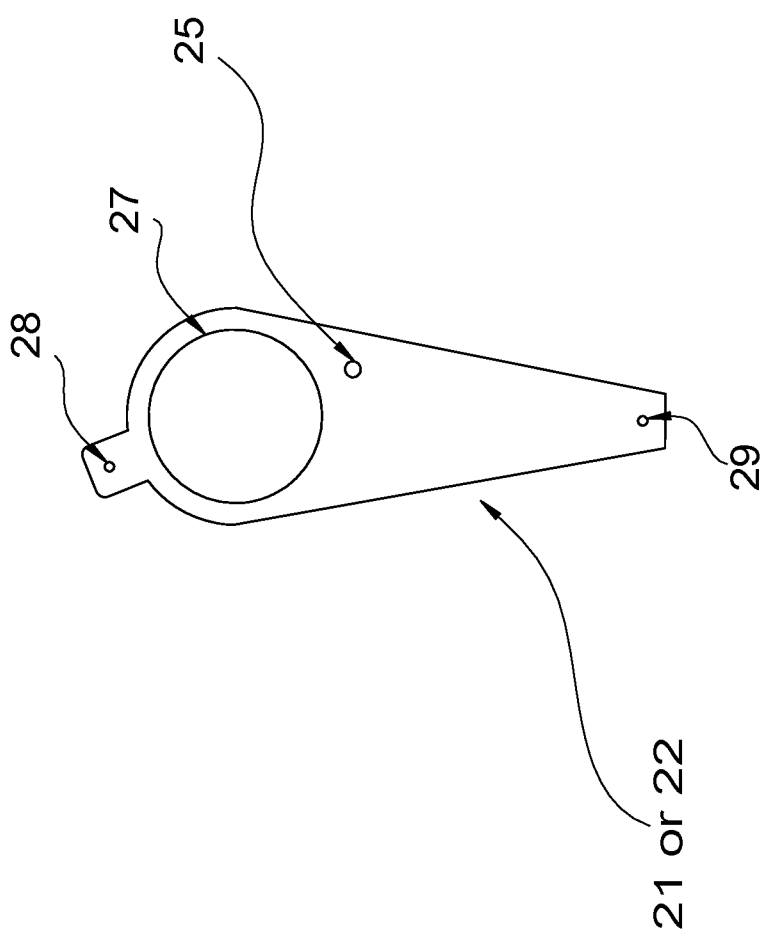
FIG. 15 is a front view of a receiver support 21 or 22.

FIG. 15 is a front view of a receiver support. Receiver supports 21 and 22 are mirror image of each other. Hole 27 is intended for receiving a receiver 60, which may be an evacuated solar tube in applications where the solar concentrator is used as a solar cooker. Hole 27 can be easily modified to receive receiver 60 of any other shape. Pivot hole 29, together with pivot hole 18, could be used to pivotably connect receiver support 21 to support rib 11, or receiver 22 to support rib 12. A fastener through holes 28 is used to connect with the hook-shaped opening 33 on one end of the extension arm 31.

In one embodiment of the solar concentrator system 5, the support ribs 11 and 12, the receiver supports 21 and 22, extension arms 31, arms 101, 102, 111 and 112, are laser cut from flat sheet materials such wood, bamboo, engineered wood, laminate, composite, synthetic, plastic, carbon steel, aluminum, stainless steel or other flat sheets. In another embodiment of the trough concentrator 5, these aforementioned parts are made of plastics, and can be injection molded, vacuum-formed, or manufactured by any other means. It is to be understood that many additional means and arrangements of assembling the trough concentrator 5 are envisioned and fall within the scope of this disclosure.

Embodiments of the trough concentrator 5 may have any number of pair of support ribs 10 depending on the nature of the reflecting sheet 50 and other desired characteristics of the system 5. For example, a relatively large and/or heavy reflecting sheet 50 may have five, six, or more pairs of support ribs 10, while a small and light reflecting sheet 50 may have only two pairs of support ribs 10.

The receiver 60 may slide laterally along the focal line of the reflecting sheet 50. In the application as a solar cooker, receiver 60 is preferably an evacuated tube. During installation, the receiver can enter through hole 27 of the receiver supports 21 and 22. Fasteners such as clamps or straps can be applied to one end or both ends of the evacuated tube to secure the receiver in place and prevent it from accidentally falling out of the holes 27 causing damage to the receiver.

The trough concentrator 5 of the present disclosure may be unfolded and extended quickly to provide readily available, portable power or thermal heat. When the usage is completed, the system can be folded and retracted to an extremely compact size for ease of transportation and storage. Due to the range of possibilities for transportation and storage, the system of the present disclosure may lend themselves to adaptation to many different sizes of systems and levels of portability. For instance, a person could carry a small system into the backcountry to charge and run a cell phone or other small electronics. A personal vehicle could carry a medium sized system into the field to power such things as drills, water pumps, or research equipment or to provide thermal heat for cooking. A truck could carry a large system suitable for industrial or military use. The systems of the present disclosure can also be applied to stationary uses both grid-connected, such as solar farms, rooftops, and other applications, and off-grid such as for a village, settlement, electric signpost, factory, etc.

While the foregoing discussion mainly references to solar thermal energy collection for ease of explanation, the concepts of the present disclosure could also be applicable to collection of other types of electromagnetic radiation, sound waves, and other such concentratable phenomena. The parabolic trough concentrator can also be used as a communication antenna, or a sound concentrator for surveillance or eavesdropping activities, which are often legally conducted by the law enforcement or the government intelligence community.

While the embodiments have been described in detail, it will be apparent to one skilled in the art that various changes and modifications can be made therein without departing from the spirit and scope thereof. Accordingly, it is intended that the present disclosure covers the modifications and variations thereof, provided they come within the scope of the appended claims and their equivalents.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, the thereby enable others skilled in the art to best utilize the invention and various embodiments with various modifications as are suited to the particular use contemplated.

What is claimed is:

1. A foldable parabolic trough concentrator for concentrating a wave phenomenon, comprising:
   a) At least two pairs of support ribs; wherein each pair of support ribs comprising two support ribs; each support rib having a base flange and an edge flange; said two support ribs in said pair pivotably connected to form an angle theta, allowing a clamshell-style folding and unfolding by varying said angle theta between a minimum value corresponding to a retracted state and a maximum value corresponding to an extended state in a cross-sectional direction; the base flange of each support rib having a curved edge conforming to a parabolic curve, and two grooves, one at each end of the curved edge; when said angle is at said maximum value, the curved edges on said pair of support ribs conform to said parabolic curve;
   b) A scissor mechanism pivotably connecting the edge flanges of said pairs of support ribs, allowing the distance between said pairs of support ribs to vary between a minimum distance corresponding to a retracted state and a maximum distance corresponding to an extended state in a longitudinal direction; said longitudinal direction having a first end and a second end;

c) Two pairs of receiver supports; each pair of receiver supports comprising two receiver supports pivotably connected, and having a hole for receiving the receiver; each pair of receiver supports is pivotably connected to the base flanges of a pair of support ribs at each end of the longitudinal direction;

d) A plurality of extension arms for holding said angle theta to its maximum value;

e) A plurality of semi-rigid reflecting sheets, held to conform to the curved edges of the support ribs by the compression force exerted by said grooves; said reflecting sheets conforming to a parabolic trough surface and a focal line when the parabolic trough concentrator is extended in both the cross-sectional and the longitudinal directions;

f) A receiver for the concentrated wave phenomenon extending in the direction of the focal line, said receiver is supported by the two pairs of receiver supports.

2. The parabolic trough concentrator in claim 1, wherein said receiver is a vacuum insulated tube for collecting solar energy.

3. The parabolic trough concentrator in claim 1, wherein said receiver is a solar panel for generating electricity.

4. The parabolic trough concentrator in claim 1, wherein said receiver is a receiver for sound wave.

5. The parabolic trough concentrator in claim 1, wherein said angle theta has a maximum value of 126 degree.

6. The parabolic trough concentrator in claim 1, wherein said curved edge conforms to an equation $y=x*x/(4*L)$, where L is a focal length.

7. The parabolic trough concentrator in claim 1, further comprises spreaders pivotably connected between adjacent support ribs.

8. The parabolic trough concentrator in claim 1, wherein said support rib further comprises a curved strip attached to the curved edge on the base flange.

9. The parabolic trough concentrator in claim 1, further comprises a support stand, said support stand comprising:

a. Two A-frame structures, each A-frame structure comprising a first leg made out of a square tube and a second leg made out of a U-shaped channel; said first leg and said second leg pivotably connected to form an angle alpha, said angle alpha is allowed to vary between zero and a maximum value; said first leg having a smaller cross-sectional dimension than the second leg, allowing the first leg to fit inside the channel of the second leg; each first leg having a upper end and a lower end, and a pivot hole near said upper end;

b. Two sets of spreaders allowing the distance between the two A-frame structures to be varied;

c. A rod going through the pivot holes of the first legs of the A-frames to allow the support stand to pivotably support the pairs of receiver supports;

d. A telescopic mechanism to adjust a zenith angle of the parabolic trough concentrator.

10. The parabolic trough concentrator in claim 2, wherein said angle theta has a maximum value of 126 degree.

11. The parabolic trough concentrator in claim 10, wherein said curved edge conforms to an equation $y=x*x/(4*L)$, where L is a focal length.

12. The parabolic trough concentrator in claim 11, further comprises spreaders pivotably connected between adjacent support ribs.

13. The parabolic trough concentrator in claim 12, wherein said support rib further comprises a curved strip attached to the curved edge on the base flange.

14. The parabolic trough concentrator in claim 9, wherein said curved edge conforms to an equation $y=x*x/(4*L)$, where L is a focal length.

15. The parabolic trough concentrator in claim 14, further comprises spreaders pivotably connected between adjacent support ribs.

16. The parabolic trough concentrator in claim 15, wherein said support rib further comprises a curved strip attached to the curved edge on the base flange.

* * * * *